Patented Aug. 5, 1941

2,251,824

UNITED STATES PATENT OFFICE 2,251,824

TREATMENT OF CONCRETE FORMS

Roy T. Edwards, New York, N. Y., assignor to Socony-Vacuum Oil Company, Incorporated, New York, N. Y., a corporation of New York No Drawing. Application March 22, 1941, Serial No. 384,775

6 Claims. (Cl. 25—154)

This invention is directed to a method of treating concrete forms, particularly metal forms designed for repeated reuse, such as the forms utilized in lining tunnels, aqueducts, and the like, or other constructions where reuse of forms is practiced.

This invention has for an object the provision of a novel method of treating such forms, achieving freedom from adherence, smoothness of finished concrete, and preservation of the forms under adverse conditions to a degree not heretofore readily possible.

When cement is poured into forms, considerable trouble due to the sticking of solidified cement to the forms is encountered. It has been the practice to coat such forms with mineral oils of various viscosities, crankcase drainings, some forms of water-in-oil emulsions and other similar products immiscible with water. The difficulties are especially pronounced in large outdoor construction projects when very high vertical form walls are used and exposed to the action of sun heat. In such cases any protective coating heretofore known proved to be unsatisfactory for the upper parts of these vertical form walls. The forms were easily removed from the lower parts of the concrete mass but could not be removed without breaking from the upper parts. This was due, of course, to the thinning of the concrete form slushing compound and flowing down the form.

Among the products used to date, the mineral oils have been the cheapest but have not always been satisfactory because they do not cling well to the surface of the metal forms. Water-in-oil emulsions have been more satisfactory, but they have not received wide acceptance because the emulsifiers used, such as magnesium soaps of sulfated fatty acids, made the compounds quite expensive.

This invention is based upon the discovery that certain mineral oil sulfonates, particularly cheap grades of those mineral oil sulfonates, can be used advantageously in concrete form slushing compounds.

The concrete form slushing compound to which this application is directed is a water-in-oil emulsion, of which a light mineral oil, water, and a mineral oil sulfonate, combined with an alkaline earth or heavy metal, are the chief components.

Because of the manufacturing process, there is always some oil entrainment present in the mineral sulfonates. In higher grades of commercial mineral sulfonates, the oil content may be as low as 10% to 30%, while in the semi-refined sulfonates the oil content may be as high as 70%. It has been discovered that for the purpose of manufacturing concrete form slushing compounds, it is not necessary to resort to the more expensive high grade sulfonates. The semi-refined grades containing from 15% to 50% sulfonates and from 50% to 85% mineral oil are satisfactory.

In order to exemplify the present invention, there are given below the following experimental data.

Example I

| | Per cent |
|---|---|
| 100" mineral oil | 40 |
| Semi-refined mineral oil sulfonates | 10 |
| Magnesium sulfate | 1 |
| Water | 49 |

Example II

| | Per cent |
|---|---|
| 100" mineral oil | 40 |
| Semi-refined mineral oil sulfonates | 10 |
| Aluminum sulfate | 0.6 |
| Water | 49.4 |

Example III

| | Per cent |
|---|---|
| 100" mineral oil | 40 |
| Semi-refined mineral oil sulfonates | 10 |
| Magnesium sulfate | .65 |
| Aluminum sulfate | .35 |
| Water | 49 |

All of the above compositions are prepared by dissolving the mineral oil sulfonates in the oil and the salt, or salts, in water. The aqueous solution is added to the oil slowly with continuous agitation. The product is a creamy opaque water-in-oil emulsion which cannot be diluted with water.

100" mineral oil used in the preparation of the exemplary compositions is a 100" naphthenic oil. However, this particular grade of oil was used because it is one of the cheapest available, and other mineral oils, paraffinic, naphthenic, or mixed base, with a viscosity ranging from 50" to 600" S. U. V. at 100° F. may be used.

The mineral oil sulfonates are semi-refined sodium sulfonates recovered as by-products from sulfuric acid refining of light mineral oils such as turbine oils, white oils, etc. The semi-refined mineral oil sulfonates used in the above three examples contained 30% of sodium sulfonate, the balance being entrained mineral oil. Therefore, Example No. I may be as well reformulated as follows:

| | Per cent |
|---|---|
| 100" mineral oil | 47 |
| Sodium sulfonate | 3 |
| Magnesium sulfate | 1 |
| Water | 49 |

In other words, a mineral oil sulfonate of any concentration or purity, may be used, the choice depending mostly on economic considerations. For convenience sake there is given below the range of composition in terms of pure mineral oil sulfonates.

The usable ranges of compositions are as follows:

| | Per cent |
|---|---|
| Mineral oil sulfonates | from 1 to 20 |
| Mineral oil | from 15 to 60 |
| Alkaline earth or heavy metal salts | In proportion to the carrying capacity of the sulfonated mineral oil |
| Water | from 15 to 65 |

Magnesium and aluminum sulfates are common products of commerce.

Concrete form of slushing compounds as exemplified in the present outline of invention have been successively applied in the field on large water supply construction projects.

A description of the method of use and results obtained follows:

The forms are made of heavy structural iron reinforcement with a quarter-inch steel plate on the outer surface. Concrete is mixed on the surface of the ground and transmitted to the tunnel thru ducts by gravity into portable cars. These cars are towed into position, and the concrete is fed thru a pressure gun which delivers the concrete mix thru a 6-inch pipe to the top of the form. All of the concrete must enter the space between the top of the form and the rough rock and pours over the form until all voids are completely filled under pressure. After the proper curing time has elapsed, the forms are removed for the next location.

Various oils have been tried to protect the form surfaces. Because of the severe scouring action of the wet concrete passing over the entire surface of the form, much difficulty was experienced in getting a coating material to adhere to the steel form. Ordinary mineral oils varying from 100″ stock to as much as 1000″ oils were tried with poor results. The surface of the finished concrete was marred when the forms were removed, and extra finishing was necessary to give the concrete an acceptable surface. The forms then had to be entirely dismantled to remove all traces of concrete before re-using.

The material of Example I was then tried, and the results were remarkable. This material withstood the scouring action of the concrete and no cleaning was required after removal of the forms. In fact, one tunnel 6,000 feet in length was completed with the form soap without dismantling the large Jumbo Rig supporting the form sections. The concrete surface was very smooth with practically no signs of pitting or discoloration. No extra refinishing was necessary. The forms used on this last tunnel were slushed with the form soap for protection and have been lying on the ground surface for the past three weeks during inclement weather. Inspection of the forms shows no rusting whatsoever and no further cleaning is necessary to start the next concrete job. There was absolutely no cleaning required on these forms when they were brought to the surface for storage.

The mixture is applied with stiff, white-wash brushes between each pouring job, and approximately 625 square feet of surface can be covered per gallon of material.

While the examples and formulae thus far given speak of sodium or alkali metal sulfonates, the true nature of the sulfonates useful in forming the final composition is that of a sulfonate of a polyvalent metal such as aluminum or magnesium, formed by double decomposition between the sodium sulfonate and the aluminum sulfate or magnesium sulfate used in the formula, said double decomposition taking place during the mixing. In normal circumstances, sodium sulfonates form only oil-in-water emulsions, and such are relatively useless for the present purpose. Sulfonates of polyvalent metals, such as aluminum, magnesium, calcium, barium, iron, etc., form water-in-oil emulsions.

Consequently it may be noted that the invention comprises treating the forms with a slushing compound comprising a water-in-oil emulsion containing a polyvalent metal salt of a sulfonic acid derived from mineral oil. Further, the particular sulfonic acids are those known as mahogany acids and derived from heavy treatment of viscous mineral oil fractions. That is such acids are those which arise from the treatment of oils of about seventy to one thousand seconds Saybolt viscosity at 100° F. with 20 pounds or more per barrel of 90% or stronger sulfuric acid. After separation of the sludge produced by such treatment from the oil, such acids remain dissolved in the oil, and may be removed therefrom by neutralization with alkali and extraction of the salt from the oil with water or aqueous alcohol. The resulting alkali metal salt may then be converted to the desired salt of a polyvalent metal, and that salt used directly, or more conveniently and cheaply, a sufficient quantity of a salt of a polyvalent metal, such as a sulfate of aluminum, magnesium, calcium, barium, or iron may be used, together with the alkali metal sulfonate, to bring about formation of the desired polyvalent metal sulfonate in the fabricated emulsion.

I claim:

1. That method of treating concrete forms, particularly metal forms designed for reuse, comprising applying to the surface of such forms a water-in-oil emulsion formed substantially of mineral oil, water, and a polyvalent metal salt of a mahogany sulfonic acid derived from mineral oil by heavy acid treatment.

2. That method of treating concrete forms, particularly metal forms designed for reuse, comprising applying to the concrete-contacting surface thereof a water-in-oil emulsion formed substantially of mineral oil, water, and a sulfonic acid salt of a polyvalent metal and a mahogany sulfonic acid derived from mineral oil by treatment of a viscous mineral oil with twenty pounds or more of 90% or stronger sulfuric acid.

3. That method of treating concrete forms, particularly metal forms designed for reuse, comprising applying to the concrete-contacting surfaces thereof a water-in-oil emulsion formed by mixing together a mineral oil, water, the alkali metal salt of a mahogany sulfonic acid derived from viscous mineral oil by heavy treatment thereof with sulfuric acid, and sufficient of a salt of a polyvalent metal to effect double decomposition to form a polyvalent metal sulfonate in the emulsion.

4. The method of claim 3 in which the polyvalent metal salt is selected from the group consisting of salts of aluminum, magnesium, calcium, barium, and iron.

5. That method of treating concrete forms, particularly metal forms designed for reuse, comprising applying to the concrete-contacting surfaces thereof a water-in-oil emulsion formed by mixing together a mineral oil, water, the alkali metal salt of a mahogany sulfonic acid derived from viscous mineral oil by heavy treatment thereof with sulfuric acid, and sufficient of a salt of aluminum to bring about double decomposition and the formation in the emulsion of an aluminum sulfonate.

6. That method of treating concrete forms, particularly metal forms designed for reuse, comprising applying to the concrete-contacting surfaces thereof a water-in-oil emulsion formed by mixing together a mineral oil, water, the alkali metal salt of a mahogany sulfonic acid derived from viscous mineral oil by heavy treatment thereof with sulfuric acid, and sufficient of a salt of magnesium to bring about double decomposition and the formation in the emulsion of a magnesium sulfonate.

ROY T. EDWARDS.